UNITED STATES PATENT OFFICE.

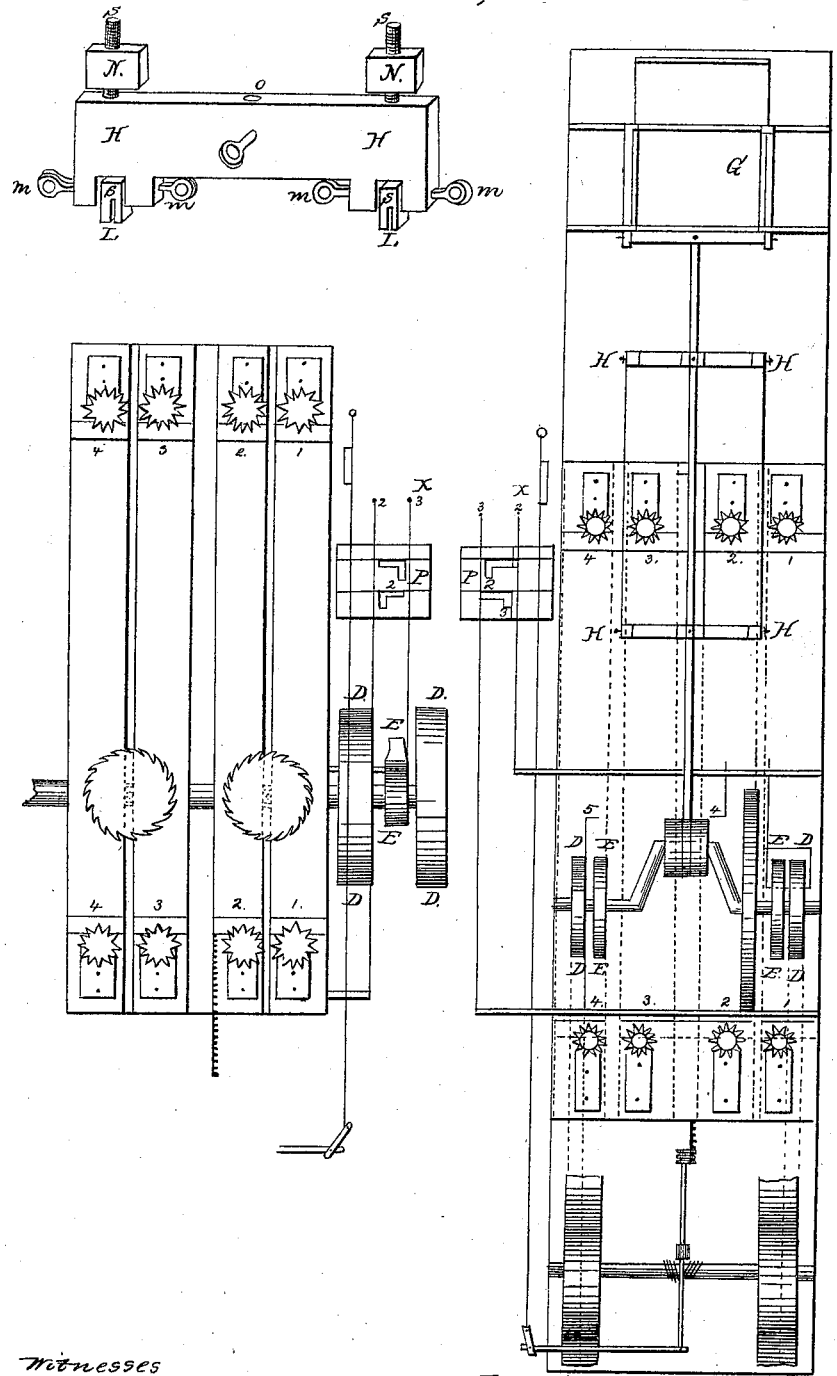

A. S. T. COPELAND, OF PITTSBURGH, PENNSYLVANIA.

SAWING MACHINERY.

Specification of Letters Patent No. 15,414, dated July 29, 1856.

*To all whom it may concern:*

Be it known that I, A. S. T. COPELAND, of Pittsburgh, in the county of Allegheny and State of Pennsylvania, have invented a new and useful Improvement in Sawmills, called "A. S. T. Copeland's Stationary and Portable Sawmills."

My invention embraces a new method of hanging and straining saws, and reversing pitman and circular saw shafts, and setting and reversing logs. The lower end of pitman is connected to pitman shaft and the top or apex end of pitman to pitman-gate G. The saws are hung and strained in saw heads H H attached at right angles to pitman. Said saw heads having an orifice O, through which pitman passes, are movable on pitman, so as to suit any length of saws without alteration of mill work. The saw heads are fastened to pitman by set screws Q, one on the reverse sides of each saw head.

S, S, are saw strainers working in saw heads by means of screw nuts N, N.

L, L, are slits or openings in saw strainers to receive ends of saws, which are connected to strainers by pins passing through saw eyes. That part of saw strainer which passes through saw head and projects above it is a screw and the saw being attached to strainer in the manner indicated is strained by turning the screw nut.

M M M M are a series of set screws—four on each side of each strainer—for adjusting and holding the front and back edge of saws in their right lines. Two saws may be thus hung and strained one on each side of pitman.

The saws when hung and strained as aforesaid have a peculiar manner of working in the logs different from any reciprocating saws ever before used, the bottom of saw cutting from the center of log to bottom of log and the top of saw cutting from the top of log to center of log, the saw in its downward motion describing two arcs of two circles which meet in center of log.

To accomplish this peculiar working of saws, the upper saw head should be set at say one third the length of pitman below top or apex end of pitman.

Pitman and circular saw shafts are reversed so as to enable the saws to cut through the logs each way, in manner following, viz: 2 and 3 are two belt-reversers standing in catch plate P. By moving belt-reverser 3 into catch 3, a connecting and running pulley D, is thrown into gear with dog or cam E, on pitman or circular saw shaft (as the case may be) and the saws are started. Then log carriage having been put in motion (by means of my mechanism for operating sawmill carriages patented July 4, 1854) so as to feed saws, the saws continue to work until logs run out, when pin in log carriage coming in contact with belt-reverser 3 sets it off stopping saws. By moving belt-reverser 2 into catch 2 another connecting and running pulley D, is thrown into gear with dog or cam E and pitman or circular-saw shaft (as the case may be) is reversed and the motion of saws is reversed. Then log carriage being reversed and put in motion, saws again commence cutting. Thus the saws cut through the logs each way. The stopping of saws by the setting off of belt-reversers in the manner described has this advantage, that the saw shaft is allowed to rest while the carriage runs out for a new set.

In the circular sawmill, two circulars are attached to saw shaft so as to cut in reverse directions; and, two logs being placed on carriage, the saws cut their respective logs alternately as the carriage moves forward and backward and the saws have thus alternate periods of rest and time to cool.

1 and 1, 2 and 2, 3 and 3 and 4 and 4 are iron log-reversers set in head blocks on log carriage and all moving reversely to each other. The log-reverser is a cylinder furnished with teeth which take hold of end of log, the bottom of log-reverser working in head block and the upper part working in strap connected with head block by set screws. The log-reverser is moved by means of wrench applied to square at the top of reverser. By means of said log-reversers the logs are set and held and also are moved from one side of saws to the other as may be required, and they work in such manner as to permit the log carriage to run the logs out past the saws, at each end of carriage, without any alteration of mill work. The carriage having run out past the saws, log-reversers are reversed for a new set, and thus all former methods of holding and setting logs are superseded.

I do not claim that attaching a saw to pitman is new; nor do I claim the muley saw, gate or sash spring, pole or levers, crank pins set in balance wheels, or any other connections on old principles. But I do claim as my invention—

1. The saw heads H H and saw strainers S S, and the combination of said saw heads and strainers with the screw nuts N N and screws Q Q and M, M, in any manner substantially the same as hereinbefore shown and described for the purposes set forth.

2. Also, the attaching of saw-heads to pitman in any manner substantially the same as hereinbefore shown and described for the purposes set forth.

3. Also, the combination of belt-reversers 2 and 3 with the mechanism for starting and stopping saws and reversing pitman and circular saw shafts in any manner substantially the same as hereinbefore shown and described for the purposes set forth.

4. Also, log reversers, 1 and 1, 2 and 2, 3 and 3, and 4 and 4, operating in the manner hereinbefore shown and described for the purposes set forth.

A. S. T. COPELAND.

Witnesses:
MARCUS W. ACHESON,
THOS. STEEL.